US011269417B2

(12) United States Patent
Ueno et al.

(10) Patent No.: US 11,269,417 B2
(45) Date of Patent: Mar. 8, 2022

(54) ELECTRONIC DEVICE CONFIGURED TO COMMUNICATE WITH AN INTERCOM, AND CONTROL METHOD THEREOF

(71) Applicant: KYOCERA Corporation, Kyoto (JP)

(72) Inventors: Yasuhiro Ueno, Yokohama (JP); Shigeki Tanabe, Yokohama (JP); Hideki Morita, Yokohama (JP); Isao Masuike, Machida (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/349,738

(22) PCT Filed: Nov. 8, 2017

(86) PCT No.: PCT/JP2017/040308
§ 371 (c)(1),
(2) Date: May 14, 2019

(87) PCT Pub. No.: WO2018/092659
PCT Pub. Date: May 24, 2018

(65) Prior Publication Data
US 2020/0073479 A1 Mar. 5, 2020

(30) Foreign Application Priority Data
Nov. 15, 2016 (JP) .............................. JP2016-222615

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06F 3/0482* (2013.01); *G06F 3/04883* (2013.01)

(58) Field of Classification Search
CPC ...... G06F 3/017; G06F 3/0304; G06F 3/0482; G06F 3/04883
See application file for complete search history.

(56) References Cited

U.S. PATENT DOCUMENTS

| 8,710,951 B2 | 4/2014 | Nakade et al. |
| 9,438,843 B2 | 9/2016 | Nakade et al. |

(Continued)

FOREIGN PATENT DOCUMENTS

| EP | 3528477 A1 | 8/2019 |
| JP | 2010-154318 A | 7/2010 |

(Continued)

*Primary Examiner* — Mandrita Brahmachari
(74) *Attorney, Agent, or Firm* — Studebaker & Brackett PC (57) ABSTRACT

An electronic device includes a proximity sensor, a communication interface that communicates with an indoor unit of an intercom, and a controller. When the communication interface acquires a signal indicating receipt of a call notification by the indoor unit of the intercom, the controller executes processing to control the indoor unit of the intercom based on a gesture detected by the proximity sensor. An electronic device includes a proximity sensor, a communication interface that communicates with an outdoor unit of an intercom, and a controller. When the communication interface acquires a call notification from the outdoor unit of the intercom, the controller executes processing to control the outdoor unit of the intercom based on a gesture detected by the proximity sensor.

16 Claims, 6 Drawing Sheets

(51) Int. Cl.
  *G06F 3/0482* (2013.01)
  *G06F 3/04883* (2022.01)

(56) References Cited

U.S. PATENT DOCUMENTS

| | | | |
|---|---|---|---|
| 9,538,115 | B2 | 1/2017 | Nakade et al. |
| 10,037,083 | B2 | 7/2018 | Nii |
| 2011/0195758 | A1* | 8/2011 | Damale ............. H04M 1/72451 |
| | | | 455/569.1 |
| 2012/0139689 | A1 | 6/2012 | Nakade et al. |
| 2012/0162057 | A1* | 6/2012 | Tan ......................... G06F 3/011 |
| | | | 345/156 |
| 2013/0187855 | A1* | 7/2013 | Radakovitz ........... G06F 3/0227 |
| | | | 345/163 |
| 2014/0168524 | A1 | 6/2014 | Nakade et al. |
| 2014/0282272 | A1 | 9/2014 | Kies et al. |
| 2014/0368421 | A1* | 12/2014 | Smus .................... G06F 3/0412 |
| | | | 345/156 |
| 2014/0380252 | A1* | 12/2014 | Tanaka ................... G09G 3/002 |
| | | | 715/863 |
| 2015/0277848 | A1* | 10/2015 | Grothe .................... G06F 3/017 |
| | | | 340/4.42 |
| 2015/0319407 | A1* | 11/2015 | Frankel .................. H04N 7/186 |
| | | | 348/14.02 |
| 2015/0346831 | A1 | 12/2015 | Nii |
| 2016/0118036 | A1* | 4/2016 | Cheatham, III ..... G10K 11/178 |
| | | | 380/252 |
| 2016/0187995 | A1* | 6/2016 | Rosewall ............... H04W 12/08 |
| | | | 345/156 |
| 2016/0216768 | A1* | 7/2016 | Goetz ..................... G06F 3/038 |
| 2016/0353048 | A1 | 12/2016 | Nakade et al. |

FOREIGN PATENT DOCUMENTS

| | | |
|---|---|---|
| JP | 2012-002767 A | 1/2012 |
| JP | 2012124545 A | 6/2012 |
| JP | 2013-026862 A | 2/2013 |
| JP | 2015-225493 A | 12/2015 |
| JP | 2016-512357 A | 4/2016 |
| JP | 201882273 A | 5/2018 |
| KR | 1020150076509 A | 7/2015 |

\* cited by examiner

| Event | Mode | Gesture-based processing | | | | |
|---|---|---|---|---|---|---|
| | | Up-down movement | Left-right movement | Trace a circle | Trace a triangle | No gesture for 5 s |
| Anything except arrival of visitor | Second mode (kitchen mode) | Scroll screen | Select recipe | — | Cancel selection | — |
| Arrival of visitor (call notification of intercom) | Second mode (kitchen mode) | Respond | Respond | Record video | Cancel selection | Hide display |
| — | First mode (regular mode) | | | | | |

111

ELECTRONIC DEVICE CONFIGURED TO COMMUNICATE WITH AN INTERCOM, AND CONTROL METHOD THEREOF

CROSS-REFERENCE TO RELATED APPLICATION

The present application claims priority to and the benefit of Japanese Patent Application No. 2016-222615 filed Nov. 15, 2016, the entire contents of which are incorporated herein by reference.

TECHNICAL FIELD

The present disclosure relates to an electronic device, a program, and a control method.

BACKGROUND

Electronic devices, such as smartphones and tablets, typically include a touch panel. A user typically controls such an electronic device by touching the touch panel. A recently developed electronic device detects a gesture, performed by the user at a distance from a terminal, using a proximity sensor such as an infrared sensor and then processes an input operation corresponding to the gesture.

SUMMARY

An electronic device according to an embodiment of the present disclosure includes a proximity sensor, a communication interface configured to communicate with an indoor unit of an intercom, and a controller. The controller is configured to execute processing, when the communication interface acquires a signal indicating receipt of a call notification by the indoor unit of the intercom, to control the indoor unit of the intercom based on a gesture detected by the proximity sensor.

An electronic device according to an embodiment of the present disclosure includes a proximity sensor, a communication interface configured to communicate with an outdoor unit of an intercom, and a controller. The controller is configured to execute processing, when the communication interface acquires a call notification from the outdoor unit of the intercom, to control the outdoor unit of the intercom based on a gesture detected by the proximity sensor.

A program according to an embodiment of the present disclosure is for an electronic device including a proximity sensor and a communication interface configured to communicate with an indoor unit of an intercom. The program causes the electronic device to acquire, using the communication interface, a signal indicating receipt of a call notification by the indoor unit of the intercom. The program causes the electronic device to execute processing to control the indoor unit of the intercom based on a gesture detected by the proximity sensor.

A program according to an embodiment of the present disclosure is for an electronic device including a proximity sensor and a communication interface configured to communicate with an outdoor unit of an intercom. The program causes the electronic device to acquire, using the communication interface, a call notification from the outdoor unit of the intercom. The program causes the electronic device to execute processing to control the outdoor unit of the intercom based on a gesture detected by the proximity sensor.

A control method according to an embodiment of the present disclosure is a control method of an electronic device including a proximity sensor and a communication interface configured to communicate with an indoor unit of an intercom. The control method includes acquiring, using the communication interface, a signal indicating receipt of a call notification by the indoor unit of the intercom. The control method includes executing processing to control the indoor unit of the intercom based on a gesture detected by the proximity sensor.

A control method according to an embodiment of the present disclosure is a control method of an electronic device including a proximity sensor and a communication interface configured to communicate with an outdoor unit of an intercom. The control method includes acquiring, using the communication interface, a call notification from the outdoor unit of the intercom. The control method includes executing processing to control the outdoor unit of the intercom based on a gesture detected by the proximity sensor.

DETAILED DESCRIPTION

Electronic Device Configuration

Figure 1:
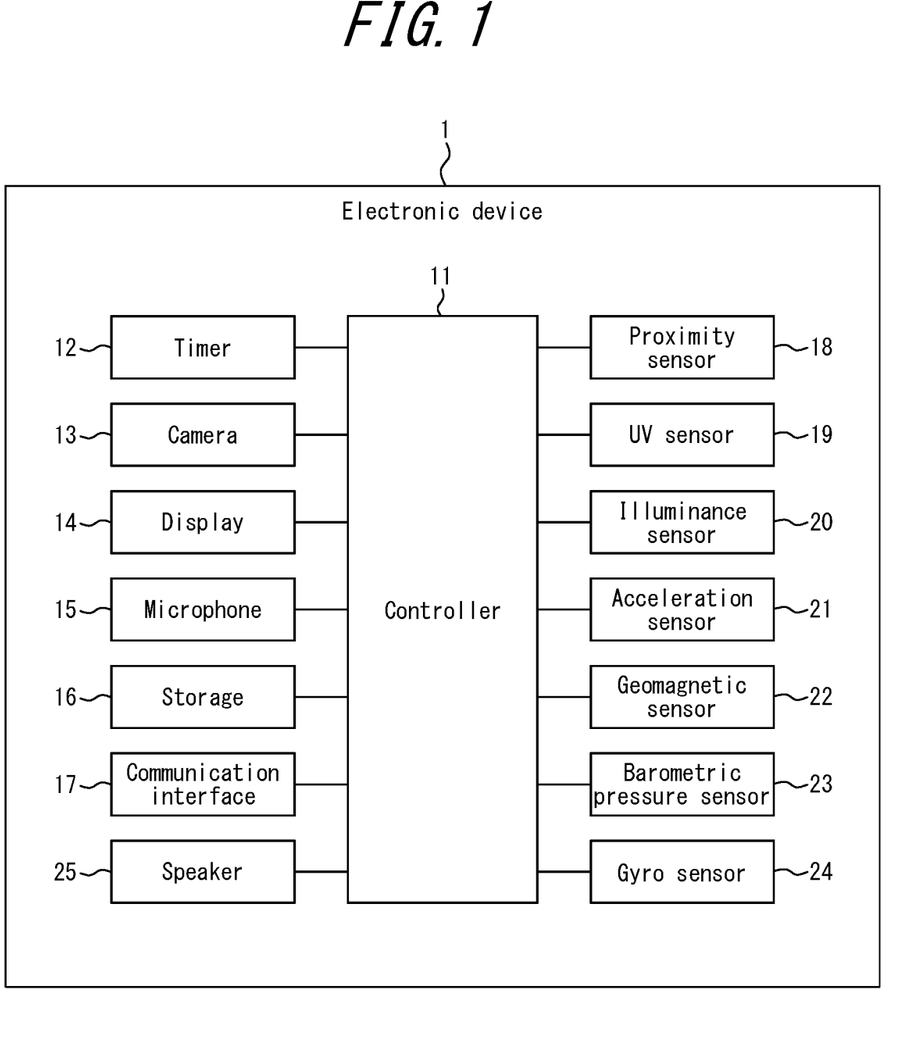
FIG. 1 is a schematic diagram of an electronic device according to an embodiment of the present disclosure.

As illustrated in FIG. 1, an electronic device 1 of an embodiment includes a display 14, a storage 16, a communication interface 17, a proximity sensor 18 (gesture sensor), and a controller 11. The electronic device 1 further includes a timer 12, a camera 13, a microphone 15, a UV sensor 19, an illuminance sensor 20, an acceleration sensor 21, a geomagnetic sensor 22, a barometric pressure sensor 23, a gyro sensor 24, and a speaker 25. FIG. 1 is only an example, and the electronic device 1 need not include all of the components in FIG. 1. Also, the electronic device 1 may include components other than those illustrated in FIG. 1.

The display 14 displays a screen. The screen includes, for example, at least one of characters, images, symbols, graphics, and the like. The display 14 may be a liquid crystal display (LCD), an organic electro-luminescence (EL) panel, an inorganic EL panel, or the like. In the present embodiment, the display 14 is a touchscreen display. The touchscreen display detects contact by a finger, a stylus, or other object and identifies the contact position. The display 14 can simultaneously detect a plurality of positions contacted by fingers, styli, or other objects.

The storage 16 functions as a memory storing programs and data. The storage 16 temporarily stores the processing results of the controller 11. The storage 16 may include any appropriate storage device, such as a semiconductor storage device or a magnetic storage device. The storage 16 may also include a plurality of types of storage devices. The storage 16 may include a combination of a portable storage medium, such as a memory card, and an apparatus for reading the storage medium.

The programs stored in the storage 16 include applications that run in the foreground or the background and a control program that supports operations of the applications. For example, the applications cause the controller 11 to execute processing corresponding to a gesture. The control program is, for example, an operating system (OS). The applications and control program may be installed on the storage 16 by communication through the communication interface 17 or from a storage medium.

The communication interface 17 is for communicating over a wired or wireless connection. The communication method of the communication interface 17 in an embodiment is prescribed by a wireless communication standard. For example, a cellular phone communication standard such as 2G, 3G, or 4G may be used as the wireless communication standard. Examples of cellular phone communication standards include Long Term Evolution (LTE), Wideband Code Division Multiple Access (W-CDMA), CDMA2000, Personal Digital Cellular (PDC), Global System for Mobile Communications (GSM® (GSM is a registered trademark in Japan, other countries, or both)), and Personal Handy-phone System (PHS). Examples of wireless communication standards include Worldwide Interoperability for Microwave Access (WiMAX), IEEE 802.11, Bluetooth® (Bluetooth is a registered trademark in Japan, other countries, or both), Infrared Data Association (IrDA), and Near Field Communication (NFC). The communication interface 17 may support one or more of the aforementioned communication standards.

Without contact, the proximity sensor 18 detects the relative distance to an object near the electronic device 1, the movement direction of the object, and the like. The proximity sensor 18 in an embodiment includes four visible light photodiodes that can detect white, red, green, and blue. The proximity sensor 18 can measure the relative distance from the object. The proximity sensor 18 also includes one infrared light emitting diode (LED) serving as a light source and four infrared photodiodes that detect the up, down, left, and right directions. The proximity sensor 18 emits infrared light, from the infrared LED serving as a light source, onto an object. The proximity sensor 18 detects the movement direction of the object by the difference in time at which reflected light from the object is incident on each of the infrared photodiodes. The proximity sensor 18 can thus detect an operation by an air gesture (gesture) that the user of the electronic device 1 performs without touching the electronic device 1.

The controller 11 is a processor such as a central processing unit (CPU). The controller 11 may be a system-on-a-chip (SoC) or other type of integrated circuit in which other components are integrated. The controller 11 may be configured by combining a plurality of integrated circuits. The controller 11 implements a variety of functions by controlling overall operation of the electronic device 1.

Specifically, the controller 11 refers as necessary to data stored in the storage 16. The controller 11 implements a variety of functions by executing instructions included in programs stored in the storage 16 to control other functional components, such as the display 14. For example, the controller 11 acquires data indicating contact by the user from the touch panel. The controller 11 also acquires a portion or all of the data detected by the UV sensor 19, the illuminance sensor 20, the acceleration sensor 21, the geomagnetic sensor 22, the barometric pressure sensor 23, and the gyro sensor 24. The controller 11 recognizes the usage conditions of the storage 16. The controller 11 also recognizes the launch status of applications.

The timer 12 receives an instruction for a timer operation from the controller 11. Once a predetermined time has elapsed, the timer 12 outputs a signal indicating that the predetermined time has elapsed to the controller 11. The timer 12 may be provided external to the controller 11, as illustrated in FIG. 1. The timer 12 may instead be provided internally within the controller 11.

The camera 13 captures images of subjects around the electronic device 1. One example of the camera 13 is a front camera provided on the same face as the display 14 of the electronic device 1.

The microphone 15 detects sound around the electronic device 1, including people's voices.

The speaker 25 outputs sound. When, for example, the news, the weather forecast, or the like is read aloud, the speaker 25 outputs the corresponding sound.

The UV sensor 19 can measure the amount of ultraviolet light included in sunlight or other light.

The illuminance sensor 20 detects the illuminance from surrounding light that is incident on the illuminance sensor 20.

The acceleration sensor 21 detects the direction and magnitude of acceleration acting on the electronic device 1. The acceleration sensor 21 is a three-axis (3D) type of sensor that detects acceleration in the x-axis, y-axis, and z-axis directions. The acceleration sensor 21 may be of any type. The acceleration sensor 21 may, for example, be a piezoresistive type. Alternatively, the acceleration sensor 21 may be a capacitive type. The acceleration sensor 21 may also, for example, be a piezoelectric element (piezoelectric type) or a thermal detection type of microelectromechanical system (MEMS). The acceleration sensor 21 may also, for example, be a servo-type of sensor that moves a moveable coil and returns the coil by feedback current. Furthermore, the acceleration sensor 21 may be a strain-gauge type of sensor that uses a strain gauge to measure strain generated by acceleration.

The geomagnetic sensor 22 detects the orientation of the earth's magnetism. For example, the orientation information acquired by the geomagnetic sensor 22 may be the component when the orientation of the electronic device 1 is projected onto a plane parallel to the ground. The orientation information acquired by the geomagnetic sensor 22 is the direction of the electronic device 1.

The barometric pressure sensor 23 detects the barometric pressure (atmospheric pressure) outside of the electronic device 1.

The gyro sensor 24 detects the angular velocity of the electronic device 1. The controller 11 can measure the orientation of the electronic device 1 by integrating the angular velocity, acquired by the gyro sensor 24, over time once.

Gesture-Based Operation of Electronic Device

Figure 2:
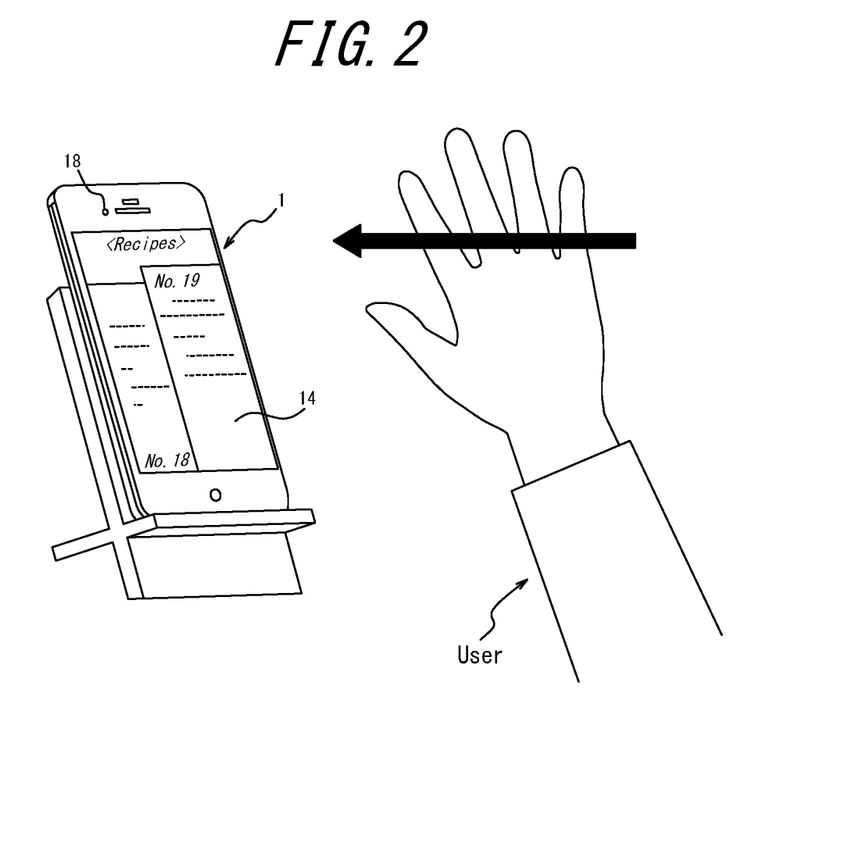
FIG. 2 illustrates a user operating an electronic device with a gesture.

FIG. 2 illustrates the user operating the electronic device 1 with a gesture. In FIG. 2, the electronic device 1 is supported by a stand as an example. Alternatively, the electronic device 1 may be leaned against a wall or placed on a table. Upon the proximity sensor 18 detecting a gesture by the user, the controller 11 executes processing based on the detected gesture. In the example illustrated in FIG. 2, the gesture-based processing is selection of a recipe. For example, when the user makes a gesture by moving a hand from right to left in the transverse direction of the display 14 (in the direction of the arrow in FIG. 2), the recipe displayed on the display 14 changes.

The electronic device 1 in FIG. 2 is a smartphone. Alternatively, the electronic device 1 may, for example, be a mobile phone, a phablet, a tablet PC, a feature phone, or other such device. The electronic device 1 is not limited to these examples and may, for example, also be a personal digital assistant (PDA), a remote control, a portable music player, a game device, an electronic book reader, a car navigation device, a household appliance, an industrial device (factory automation (FA) device), or the like.

Figure 3:
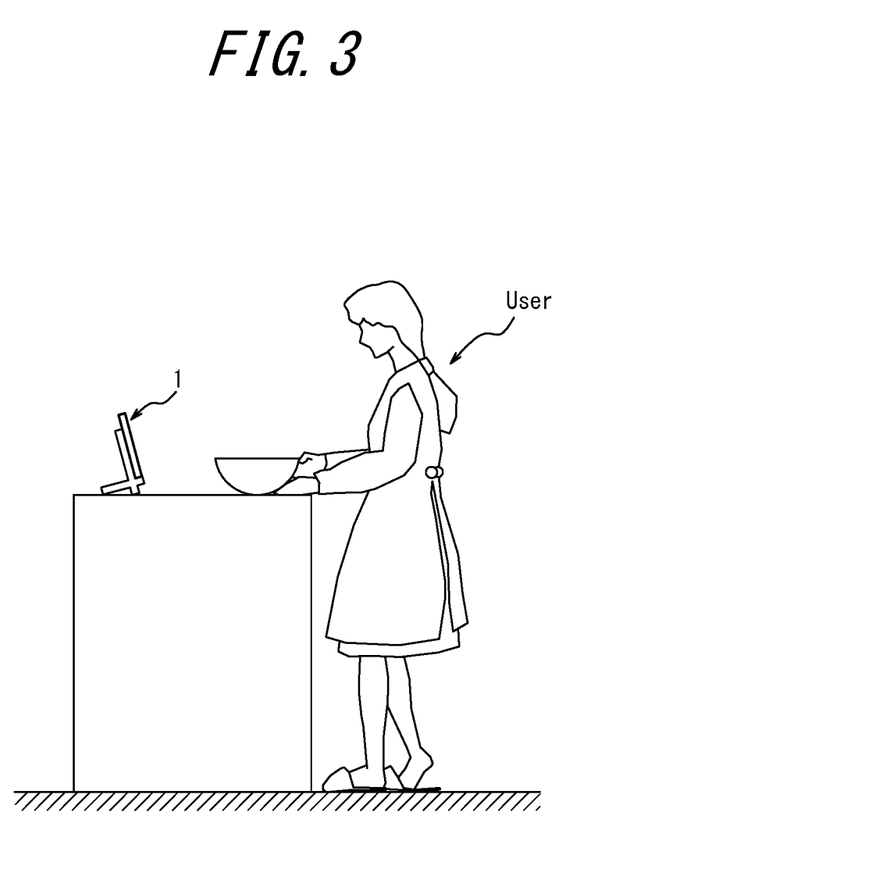
FIG. 3 illustrates example conditions in which the user operates an electronic device with a gesture.

FIG. 3 illustrates example conditions in which the user operates the electronic device 1 with a gesture. In the example in FIG. 3, the user is cooking in the kitchen by following a cooking recipe displayed on the display 14 of the electronic device 1. As mentioned above, the proximity sensor 18 detects a gesture by the user. The controller 11 executes processing based on the gesture detected by the proximity sensor 18. The controller 11 can execute processing to scroll the recipe in response to a particular gesture (such as the user raising or lowering a hand). The user's hand may become dirty or wet during cooking. The user can scroll the recipe with a particular gesture, however, without touching the electronic device 1. The display 14 therefore does not become dirty, and dirt on the display 14 can be prevented from getting on the user's hand during cooking.

The electronic device 1 has a plurality of modes. Modes refer to operation modes (operating states or operation statuses) that, for example, place restrictions on the operations of the entire electronic device 1. Only one mode can be selected at a time. In the present embodiment, the modes of the electronic device 1 include a first mode and a second mode. The second mode is an operation mode (kitchen mode) of the electronic device 1 that is optimal for cooking in the kitchen while a recipe is displayed. When in the second mode, the electronic device 1 can operate the proximity sensor 18 and detect gestures. The electronic device 1 also operates the microphone 15 when in the second mode. The electronic device 1 can then receive audio input using the microphone 15 instead of character input (from a touch panel operation by the user). The first mode is a regular operation mode (regular mode) appropriate for use in rooms other than the kitchen or outside of the home, for example. In the present embodiment, the user sets the electronic device 1 to the second mode (kitchen mode) when cooking in the kitchen. The mode may be settable from a settings screen (such as device settings on the menu screen) of the electronic device 1. The mode may also be easily settable via a notification (notification screen) that appears upon, for example, swiping the edge of the screen.

Here, it is assumed that the user has set the electronic device 1 to the second mode (kitchen mode) via a notification, for example, and is cooking in the kitchen. The user may need to stop cooking due to a sudden event occurring while the user is cooking. Examples of such an event include the arrival of a visitor. It is preferable to respond to a visitor immediately, but the user may be delayed in responding if the user first cleans off her hands. The response may be further delayed when an indoor unit 32 of the intercom is in a separate room from the kitchen. If the user responds in a hurry without cleaning off her hands, the indoor unit 32 or the front doorknob may become dirty, or dirt may get on the user's hand while in the midst of cooking.

Figure 4:
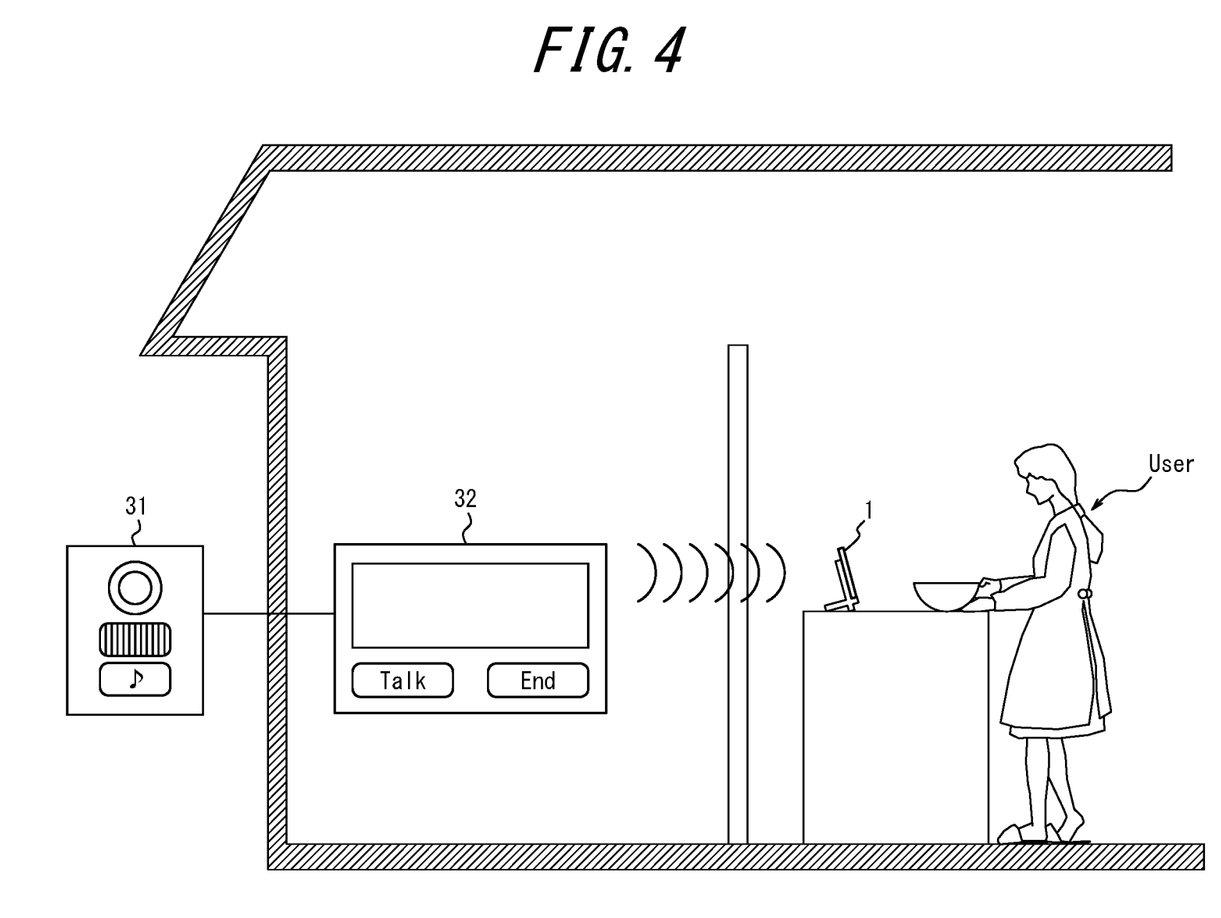
FIG. 4 illustrates example conditions of linkage between an electronic device and an intercom.

FIG. 4 illustrates example conditions in which the electronic device 1 of the present embodiment is used along with an intercom. The communication interface 17 of the electronic device 1 acquires a signal indicating that the indoor unit 32 of the intercom has received a call notification. The call notification is the notification signal outputted by an outdoor unit 31 of the intercom when a visitor pushes a button on the outdoor unit 31. After receipt of the call notification, the indoor unit 32 may output a sound (such as a chime) to indicate the presence of the visitor. In the present embodiment, the communication interface 17 communicates with the indoor unit 32 in accordance with IEEE 802.11, for example. Alternatively, the communication interface 17 may communicate with the indoor unit 32 by Bluetooth®. The electronic device 1 according to the present embodiment can communicate with the indoor unit 32 when the user is at home. In other words, the electronic device 1 and the indoor unit 32 do not communicate when the user is not home, even if the user left home with the electronic device 1. In the present embodiment, the communication interface 17 also communicates with the outdoor unit 31.

When the electronic device 1 acquires the signal indicating that the indoor unit 32 has received a call notification, the electronic device 1 executes processing to control the indoor unit of the intercom based on a gesture detected by the proximity sensor 18. The user who is cooking can therefore deal with the visitor by gesture, without touching the electronic device 1, while still in the kitchen.

Gesture Processing Information

Figure 5:
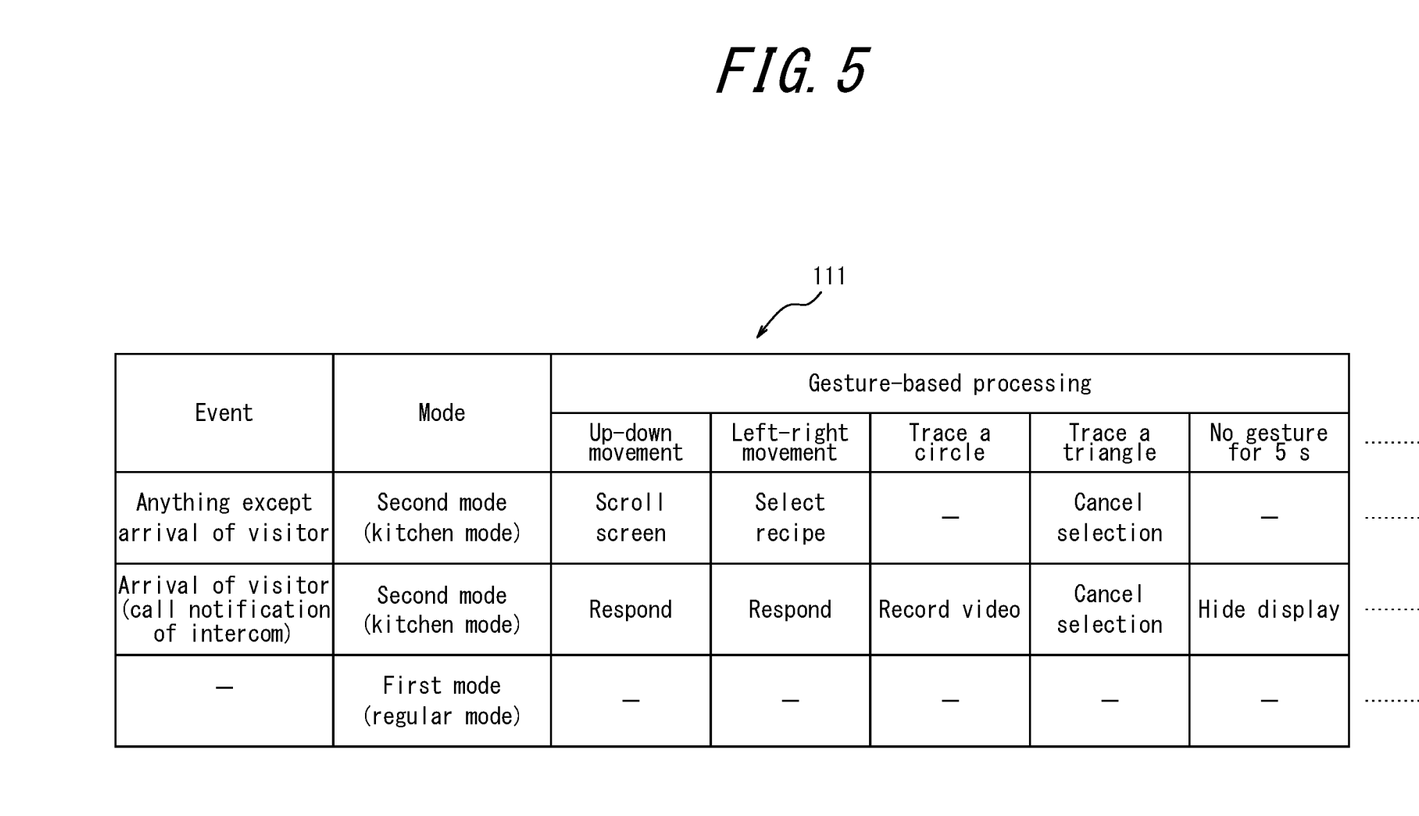
FIG. 5 illustrates an example of gesture processing information stored in a storage.

FIG. 5 illustrates an example of gesture processing information 111 stored in the storage 16. The gesture processing information 111 is a table prescribing gesture-based processing corresponding to events and modes. The gesture processing information 111 is stored in the storage 16. The gesture processing information 111 is read from the storage 16 by the controller 11.

In the present embodiment, the gesture processing information 111 includes the items "event", "mode", and "gesture-based processing".

The "event" is a sudden event occurring during the second mode (kitchen mode). In the present embodiment, the arrival of a visitor (a call notification from the intercom) is one event. When a visitor arrives, the gesture-based processing in the second mode (kitchen mode) switches. Here, the number of events for which the gesture-based processing switches is not limited to one and may instead be greater than one.

The "mode" is the operation mode of the electronic device 1. As illustrated in FIG. 5, no gesture-based processing is executed when the electronic device 1 is in the first mode (regular mode). Input operations are performed by contact with the touch panel, rather than by gesture, when the electronic device 1 is operating in the first mode (regular mode).

The "gesture-based processing" indicates processing executed based on a gesture detected by the proximity sensor 18. In the default state in the second mode (the recipe display state in the present embodiment), the controller 11 scrolls the screen displayed on the display 14 when an up-down gesture is detected. The controller 11 executes recipe selection processing when a left-right gesture is detected. Suppose that a visitor arrives, and the communication interface 17 acquires a signal indicating that the indoor unit 32 of the intercom has received a call notification. At this time, the controller 11 executes processing to respond to the visitor upon detection of an up-down gesture or a left-right gesture. In this way, the gesture-based processing switches in accordance with FIG. 5 when an event (arrival of a visitor) occurs during the second mode.

The gesture-based processing in the case of an event (arrival of a visitor) in FIG. 5 is now described in detail. The controller 11 executes processing to respond to the visitor when the proximity sensor 18 detects an up-down or left-right gesture. The processing to respond includes, for example, operating the microphone 15 and the speaker 25 of the electronic device 1 to allow voice communication with the outdoor unit 31 of the intercom. The controller 11 executes processing to record an image captured by the outdoor unit 31 on the indoor unit 32 of the intercom when the proximity sensor 18 detects a gesture to trace a circle. Alternatively, the controller 11 may record an image captured by the outdoor unit 31 on the storage 16. The controller 11 cancels the immediately prior selection by the user (such as recording) when the proximity sensor 18 detects a gesture to trace a triangle. The controller 11 hides the display 14 when the proximity sensor 18 does not detect a gesture for a certain length of time. In other words, the controller 11 stops causing the display 14 to display the image captured by the outdoor unit 31 and does not cause the display 14 to display anything. The certain length of time is 5 s in the present embodiment but may be any other length of time, such as 20 s.

Flowchart

Figure 6:
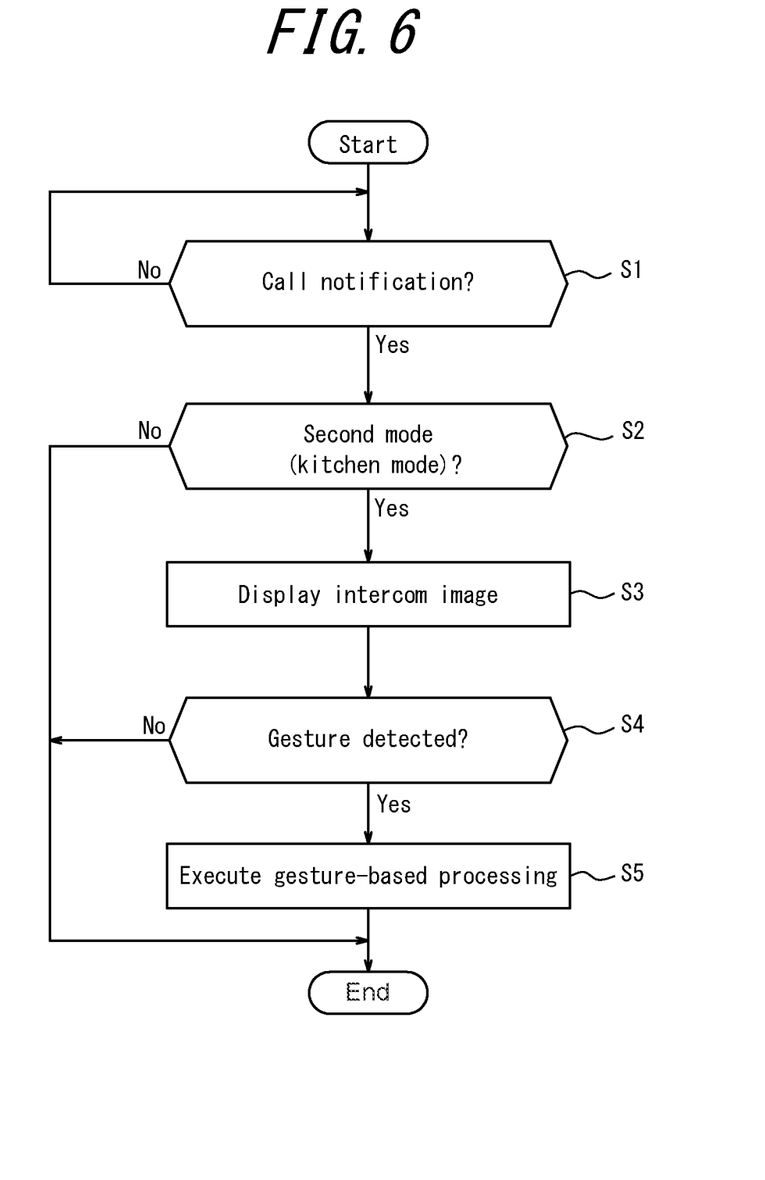
FIG. 6 is a flowchart illustrating an example of processing executed by an electronic device according to an embodiment of the present disclosure.

FIG. 6 is a flowchart illustrating an example of gesture-based processing executed by the controller 11 of the electronic device 1 according to the present embodiment.

The controller 11 judges whether a visitor has arrived, i.e. whether there was a call notification (step S1). Upon receiving a signal indicating that the indoor unit 32 has received a call notification, the controller 11 in the present embodiment judges that there was a call notification (step S1: Yes) and proceeds to step S2. When the controller 11 judges that there is no call notification (step S1: No), the controller 11 stands by until there is a call notification.

The controller 11 determines whether the mode of the electronic device 1 is the second mode (kitchen mode) (step S2). When the mode is the first mode (regular mode), i.e. not the second mode (kitchen mode) (step S2: No), the controller 11 ends the processing sequence. The user's hand is not dirty or wet at this time, since the user is not cooking. Therefore, the user can deal with the visitor by operating the indoor unit 32 of the intercom.

When the mode of the electronic device 1 is the second mode (kitchen mode) (step S2: Yes), the controller 11 proceeds to step S3. Here, the controller 11 reads the gesture processing information 111 from the storage 16. Since the event is the arrival of a visitor, the controller 11 switches the gesture-based processing in the second mode (kitchen mode) on the basis of the gesture processing information 111.

The controller 11 causes the display 14 to display an intercom image (step S3). The intercom image is the image captured by the outdoor unit 31 of the intercom.

When a gesture is not detected for a certain length of time (such as 5 s) (step S4: No), the controller 11 hides the display 14 and ends the processing sequence. When a gesture is detected (step S4: Yes), the controller 11 executes gesture-based processing on the basis of the gesture processing information 111 (step S5). For example, the controller 11 executes processing to respond to the visitor upon detection of an up-down gesture. The controller 11 then ends the processing sequence.

As described above, the electronic device 1 according to the present embodiment judges that a visitor has arrived when the communication interface 17 acquires a signal indicating that the indoor unit 32 of the intercom has received a call notification. If the electronic device 1 is in the second mode (kitchen mode), the electronic device 1 then executes gesture-based processing that differs from the default state (recipe display) on the basis of the gesture processing information 111. The electronic device 1 can execute processing to control the indoor unit of the intercom, such as responding or recording video, based on a gesture. The electronic device 1 according to the present embodiment therefore does not suspend gesture-based input operations (hands-free operations) even when a different event (arrival of a visitor) occurs. The electronic device 1 according to the present embodiment enables various operations in accordance with a variety of conditions to be performed consistently with gestures and therefore has improved operability.

Other Embodiments

Although the subject matter of the present disclosure has been described with reference to the drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

In the above embodiment, the intercom includes not only the outdoor unit 31 but also the indoor unit 32. Alternatively, the electronic device 1 may communicate with an outdoor unit 31 that does not include the indoor unit 32. The electronic device 1 according to this modification includes a communication interface 17 that communicates with an outdoor unit 31 of an intercom. The controller 11 judges that there was a call notification when the controller 11 acquires a call notification from the outdoor unit 31 of the intercom via the communication interface 17. The controller 11 then switches the gesture-based processing in the second mode (kitchen mode) on the basis of the gesture processing information 111. The electronic device 1 executes processing to control the outdoor unit 31 of the intercom based on a gesture detected by the proximity sensor 18. When the outdoor unit 31 that does not include the indoor unit 32 is not provided with a camera, functions such as video recording are omitted.

In the above embodiment, the second mode (kitchen mode) is set by user operation via a notification (notification screen). The controller 11 may set the electronic device 1 to the second mode automatically when a predetermined condition is satisfied. For example, the controller 11 judges that a first condition is satisfied when an application displaying a recipe is being executed, or when a recipe site is being viewed. The controller 11 may set the electronic device 1 to the second mode when judging that the first condition is satisfied and that a recipe is not currently being selected (for example, when the recipe is not changed for a certain length of time, such as 30 seconds). The controller 11 may set the electronic device 1 to the second mode when judging that the first condition is satisfied and that the user has not operated the touch panel for at least a certain length of time (such as one minute). The controller 11 may set the electronic device 1 to the second mode when the first condition is satisfied and the electronic device 1 has not changed position for at least a certain length of time (such as one minute).

Much of the subject matter of the present disclosure is described as a series of operations executed by a computer system and other hardware that can execute program instructions. Examples of the computer system and other hardware include a general-purpose computer, a personal computer (PC), a dedicated computer, a workstation, a personal communications system (PCS), a mobile (cellular) phone, a mobile phone with a data processing function, an RFID receiver, a game device, an electronic notepad, a laptop computer, a global positioning system (GPS) receiver, and other programmable data processing apparatuses. It should be noted that in each embodiment, various operations or control methods are executed by a dedicated circuit (for example, individual logical gates interconnected in order to execute a particular function) implemented by program instructions (software), or by a logical block and/or program module or the like executed by one or more processors. The one or more processors that execute a logical block, program module, or the like include, for example, one or more of a microprocessor, CPU, application specific integrated circuit (ASIC), digital signal processor (DSP), programmable logic device (PLD), field programmable gate array (FPGA), processor, controller, microcontroller, microprocessor, electronic device, other apparatus designed to be capable of executing the functions disclosed here, and/or a combination of any of the above. The embodiments disclosed here are, for example, implemented by hardware, software, firmware, middleware, microcode, or a combination of any of these. The instructions may be program code or a code segment for executing the necessary tasks. The instructions may be stored on a machine-readable, non-transitory storage medium or other medium. The code segment may indicate a combination of any of the following: procedures, functions, subprograms, programs, routines, subroutines, modules, software packages, classes, instructions, data structures, or program statements. The code segment may transmit and/or receive information, data arguments, variables, or memory content to or from another code segment or hardware circuit in order for the code segment to connect to another code segment or hardware circuit.

The storage 16 used here may also be configured as a computer-readable, tangible carrier (medium) in any of the categories of solid-state memory, magnetic disks, and optical discs. Data structures or an appropriate set of computer instructions, such as program modules, for causing a processor to execute the techniques disclosed herein are stored on these media. Examples of computer-readable media include an electrical connection with one or more wires, a magnetic disk storage medium, a magnetic cassette, a magnetic tape, or other magnetic or optical storage medium, such as a compact disc (CD), laser disc®, digital versatile disc (DVD®), floppy® disk, and Blu-ray disc® (laser disc, DVD, floppy, and Blu-ray disc are registered trademarks in Japan, other countries, or both). Further examples include a portable computer disk, random access memory (RAM), read-only memory (ROM), rewritable programmable ROM such as erasable programmable read-only memory (EPROM), electrically erasable programmable read-only memory (EEPROM), or flash memory, another tangible storage medium that can store information, or a combination of any of these. The memory may be provided internal and/or external to a processor or processing unit. As used in the present disclosure, the term "memory" refers to all types of long-term storage, short-term storage, and volatile, non-volatile, or other memory. In other words, the "memory" is not limited to a particular type or number. The type of medium on which information is stored is not limited, either.

REFERENCE SIGNS LIST

1 Electronic device
11 Controller
12 Timer
13 Camera
14 Display
15 Microphone
16 Storage
17 Communication interface
18 Proximity sensor
19 UV sensor
20 Illuminance sensor
21 Acceleration sensor
22 Geomagnetic sensor
23 Barometric pressure sensor
24 Gyro sensor
25 Speaker
31 Outdoor unit
32 Indoor unit
111 Gesture processing information

The invention claimed is:

1. An electronic device configured to communicate with an intercom having an indoor unit, comprising:
a proximity sensor configured to detect a gesture of a user of the electronic device;
one or more processors configured to execute functions of communicating between the electronic device and the indoor unit of the intercom and executing processing, in response to the one or more processors acquiring a signal indicating receipt of a call notification by the indoor unit of the intercom, to control the indoor unit of the intercom based on the gesture detected by the proximity sensor; and
a display,
wherein the electronic device has a first mode in which no gesture-based processing is executed and a second mode in which the electronic device operates the proximity sensor to detect the gesture of the user, and the one or more processors are configured to set the electronic device to the second mode in response to detecting that first and second conditions are satisfied, the first condition being a condition where a recipe is being displayed on the display or a condition where a recipe site is being viewed, and the second condition being a condition where the recipe is not changed for a first predetermined length of time, a condition where the user has not operated a touch panel of the electronic device for a second predetermined length of time, or a condition where the electronic device has not changed its position for a third predetermined length of time.

2. The electronic device according to claim 1, wherein when the one or more processors acquire the signal indicating receipt of the call notification by the indoor unit of the intercom, and the electronic device is in the first mode, the one or more processors do not operate gesture-based processing.

3. The electronic device according to claim 2, wherein when the one or more processors acquire the signal indicating receipt of the call notification by the indoor unit of the intercom, and the electronic device is in the first mode, the one or more processors do not control the intercom.

4. The electronic device according to claim 2, wherein in the first mode, the electronic device operates the touch panel to receive an input from the touch panel.

5. An electronic device configured to communicate with an intercom having an outdoor unit, comprising:
a proximity sensor configured to detect a gesture of a user of the electronic device;

one or more processors configured to execute functions of communicating between the electronic device and the outdoor unit of the intercom and executing processing, in response to the one or more processors acquiring a call notification from the outdoor unit of the intercom, to control the outdoor unit of the intercom based on the gesture detected by the proximity sensor; and a display, wherein the electronic device has a first mode in which no gesture-based processing is executed and a second mode in which the electronic device operates the proximity sensor to detect the gesture of the user, and the one or more processors are configured to set the electronic device to the second mode in response to detecting that first and second conditions are satisfied, the first condition being a condition where a recipe is being displayed on the display or a condition where a recipe site is being viewed, and the second condition being a condition where the recipe is not changed for a first predetermined length of time, a condition where the user has not operated a touch panel of the electronic device for a second predetermined length of time, or a condition where the electronic device has not changed its position for a third predetermined length of time.

6. The electronic device according to claim 5, wherein when the one or more processors acquire the signal indicating receipt of the call notification by the outdoor unit of the intercom, and the electronic device is in the first mode, the one or more processors do not operate gesture-based processing.

7. The electronic device according to claim 6, wherein when the one or more processors acquire the signal indicating receipt of the call notification by the outdoor unit of the intercom, and the electronic device is in the first mode, the one or more processors do not control the intercom.

8. The electronic device according to claim 6, wherein in the first mode, the electronic device operates the touch panel to receive an input from the touch panel.

9. A control method of an electronic device configured to communicate with an intercom having an indoor unit and comprising a proximity sensor configured to detect a gesture of a user of the electronic device, one or more processors configured to execute functions of communicating between the electronic device and the indoor unit of the intercom, and a display, the control method comprising:

acquiring, using the one or more processors, a signal indicating receipt of a call notification by the indoor unit of the intercom; and executing processing to control the indoor unit of the intercom based on the gesture detected by the proximity sensor, wherein the electronic device has a first mode in which no gesture-based processing is executed and a second mode in which the electronic device operates the proximity sensor to detect the gesture of the user, and the one or more processors are configured to set the electronic device to the second mode in response to detecting that first and second conditions are satisfied, the first condition being a condition where a recipe is being displayed on the display or a condition where a recipe site is being viewed, and the second condition being a condition where the recipe is not changed for a first predetermined length of time, a condition where the user has not operated a touch panel of the electronic device for a second predetermined length of time, or a condition where the electronic device has not changed its position for a third predetermined length of time.

10. The control method according to claim 9, wherein when the one or more processors acquire the signal indicating receipt of the call notification by the indoor unit of the intercom, and the electronic device is in the first mode, the one or more processors do not operate gesture-based processing.

11. The control method according to claim 10, wherein when the one or more processors acquire the signal indicating receipt of the call notification by the indoor unit of the intercom, and the electronic device is in the first mode, the one or more processors do not control the intercom.

12. The control method according to claim 10, wherein in the first mode, the electronic device operates the touch panel to receive an input from the touch panel.

13. A control method of an electronic device configured to communicate with an intercom having an outdoor unit and comprising a proximity sensor configured to detect a gesture of a user of the electronic device, one or more processors configured to execute functions of communicating between the electronic device and the outdoor unit of the intercom, and a display, the control method comprising:

acquiring, using the one or more processors, a call notification from the outdoor unit of the intercom; and executing processing to control the outdoor unit of the intercom based on the gesture detected by the proximity sensor, wherein the electronic device has a first mode in which no gesture-based processing is executed and a second mode in which the electronic device operates the proximity sensor to detect the gesture of the user, and the one or more processors are configured to set the electronic device to the second mode in response to detecting that first and second conditions are satisfied, the first condition being a condition where a recipe is being displayed on the display or a condition where a recipe site is being viewed, and the second condition being a condition where the recipe is not changed for a first predetermined length of time, a condition where the user has not operated a touch panel of the electronic device for a second predetermined length of time, or a condition where the electronic device has not changed its position for a third predetermined length of time.

14. The control method according to claim 13, wherein when the one or more processors acquire the signal indicating receipt of the call notification by the outdoor unit of the intercom, and the electronic device is in the first mode, the one or more processors do not operate gesture-based processing.

15. The electronic device according to claim 14, wherein when the one or more processors acquire the signal indicating receipt of the call notification by the outdoor unit of the intercom, and the electronic device is in the first mode, the one or more processors do not control the intercom.

16. The electronic device according to claim 14, wherein in the first mode, the electronic device operates the touch panel to receive an input from the touch panel.

* * * * *